June 1, 1937.                L. W. STRONG                2,082,305
                              FISH LURE
                          Filed Jan. 7, 1936
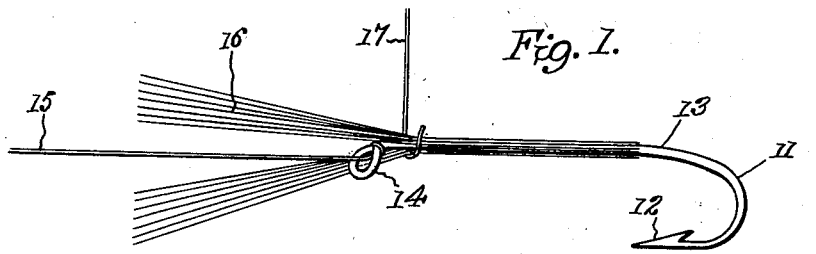
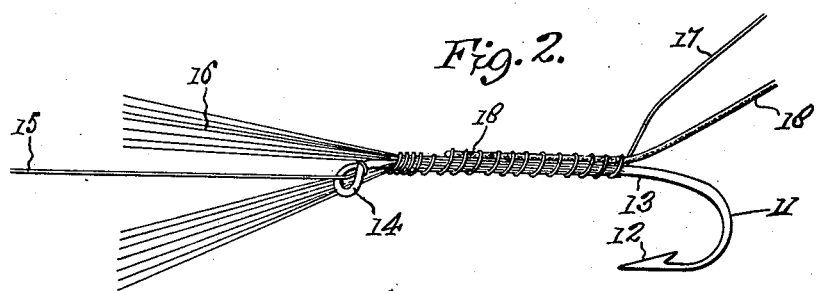
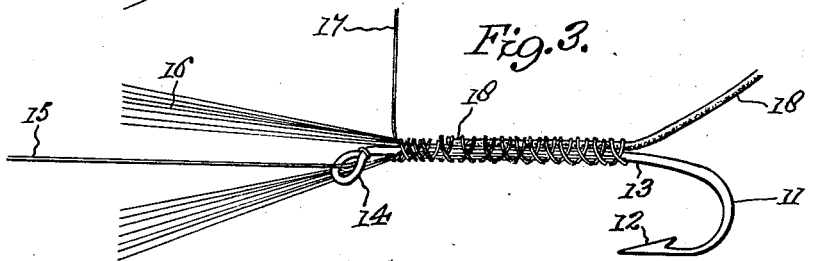
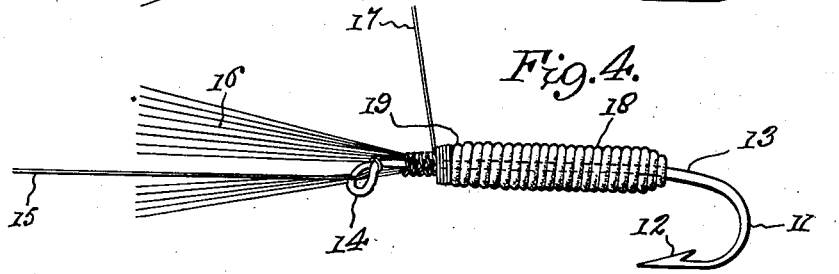
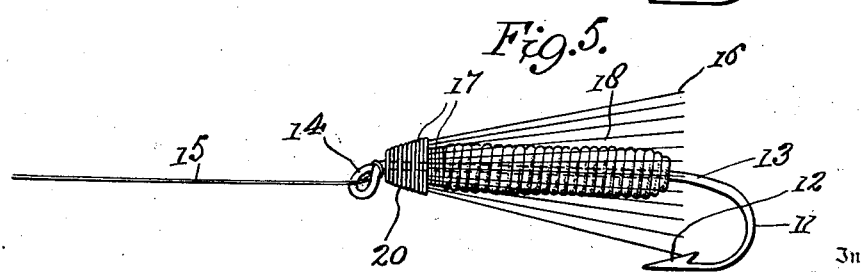
Inventor
L. W. Strong
By Wilkinson & Mawhinney
Attorneys.

Patented June 1, 1937

2,082,305

UNITED STATES PATENT OFFICE 2,082,305

FISH LURE

Leroy W. Strong, Billings, Mont.

Application January 7, 1936, Serial No. 57,969

4 Claims. (Cl. 43—48)

This invention relates to fish lures, and more particularly to certain improvements in construction and the method of manufacture of artificial lures or bait.

An object of this invention is to obtain a more alluring, life-like and compact artificial fish lure than has heretofore existed.

Another object of the invention is to provide a hackle that can be made to stand out at any desired angle.

A further object of the invention is to provide a more durable artificial fish lure able to withstand a strong strike without substantial impairment.

A further object of the invention is to provide a multicolored artificial fly simulating a live fly.

The invention has for a further object to provide a construction of fish lure wherein there may be used braided hair and braided raffia for the body portions of the lure.

The above and various other more particular objects are brought out in the specification and drawing more fully and clearly and the applicant does not wish to confine himself solely to the above stated objects.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a side elevation of a fish hook showing the inner ends of the hackles placed against the shank of the fish hook, and the binding thread therebout contiguous the eye of the fishhook preparatory to winding.

Figure 2 is a side elevation of the fishhook showing the hackles secured to the shank of the hook by the initial winding of the thread, the inner end of the hair or raffia braid being positioned beneath the thread for binding to the shank of the hook.

Figure 3 is a side elevation of the same, illustrating the reverse winding of the thread to secure the raffia or hair braid to the hook.

Figure 4 is a like view showing the colored raffia or braid wound over the thread winding and secured at its end by several turns of the latter to form the body of the lure, and Figure 5 is a similar view, showing the outer ends of the hackles bent back and secured in finished form.

In fishing, especially in fishing with artificial bait, it is imperative that the man-made fish lure simulate to as great a degree as possible the live flies and insects upon which the fish live. The sporting fish, even when ready to feed, is highly particular about its food. Consequently unless the artificial fly fascinates the fish into striking for it as an appetizing morsel it would be futile to attempt to outwit the fish with the equivalent of a bare hook. It is to be noted that a sporting fish when striking tends to tear the artificial fly even when not caught. If the fish is not snared on the first strike the fly is generally left somewhat ragged thus detracting from its appetizing appeal. With this in mind the inventor has produced a fly which will withstand a vicious strike and remain unimpaired. Even though the body portion of the lure should be cut up by a strike it still remains intact with very short stubbles of raffia protruding, and in no way causing the fish to hesitate to strike.

Referring now to the drawing, the new structure of lure will be set forth in the following.

The artificial fish lure of this invention uses as its base or form a fish hook, shown in Figure 1 which has a hook portion 11 terminating at one end in a barb 12 and at its other end in a shank 13. The shank 13 is of any suitable length and curvature and terminates at its inner or free end in an eye 14 to which is attached a gut or snell 15.

According to the present invention the inner ends of a bunch of hackle hairs or hackles 16 are placed lengthwise of and about the sides of the shank 13 of the hook with the free outer ends of the hackles extending inwardly beyond the eye 14. A binding thread 17 is now wrapped about the inner ends of the hackles 16 and the shank 13, beginning at a point spaced a short distance from the eye 14, as shown in Figure 1. This binding thread 17 is wrapped spirally about the shank and the hackles with preferably the convolutions spaced apart and the winding is continued with sufficient turns to bind the hairs to the shank until a point is reached substantially opposite to the barb 12.

During the last number of turns of the thread 17, a braid of raffia hair, or other braided material 18, which is composed preferably of strands of different colors, is laid lengthwise over the shank beneath the primary or first winding of the binding thread 17, and extends over the inner ends of the hackles 16 to preferably a distance from the eye 14 equal to substantially one-third of the length of the said primary winding, as shown in Figure 2. The binding thread 17 is now wound back upon itself and over the first winding and the braid 18 to bind the latter to the shank and build up the body of the lure. Figure 3 shows the completion of this second winding of the thread 17.

The braid 18 is now wound about the shank 13 and the inner part of the lure body formed thereon. The turns or convolutions of the braid 18 are wrapped tightly about the shank and close together into compact form and several reduced winds of the braid 18, as shown at 19, are made beyond the inner end of the braid 18 adjacent the eye 14, as shown in Figure 4. The binding thread 17 is now wrapped several turns tightly about the end 19 of the wound braid 18 just back of the eye of the hook to provide a tapered shoulder and a head portion.

The outer ends of the hackles 16 are now overturned and bent about the reduced turns 19 so as to flare outwardly about the body of the lure. The hackles 16 are held in this angular position by a number of turns of the binding thread 17, as shown in Figure 5. The hackles 16 are held at the desired angle by the relative sizes of the braid winding 19 and overlapping winding of the thread 17, adjacent the eye 14, the thickness of the braid winding being tapered off to support the hackles at the desired angle on the body of the lure.

The final turns of the thread 17 over the bent back portions of the hackles 16 provide a head 20 for the lure. The resulting structure is such that the varicolored braid is fully exposed to view so as to attract fish and admit of the selection of colors best adapted to carry out the object of the device. The end of the binding thread 17 may be turned in and secured in any suitable manner and may be given a suitable coating of wax or other desired material for reinforcing and protecting the same.

It will be understood from the above that the angular position of the hackles 16 at the head of the lure may be changed by using more or less turns of the binding thread 17 which provide the head 20.

The several reduced turns or convolutions 19 of the braid 18 on the eye end of the shank 13 may be wrapped thereabout to any practical extent to provide a tapering shoulder or support of desired slope for the bent back hackles 16 so that the latter may stand out to the desired distance about the body of the lure. The further the binding thread is wound down the shank the greater is the tendency for the hackles to lie nearer the shank. If it is desired to have the hackles stand out from the shank at a greater angle, the binding thread is wound with the convolutions closer together. This procedure gives a small, compact head 20. When playing for a fish the resistance of the hackles is of importance. When the hackles are close to the shank portion of the hook the resistance to movement thru the water is lowered thus causing the artificial fly to remain under the surface of the water or very near the top. However if the hackles are at a considerable angle approaching the perpendicular to the shank of the fishhook movement of the fly thru the water causes the fly to move in a series of little jumps. This jumping is caused by the resistance of hackles to the water, which forces the fly upward as motion continues. These series of jumps add to the life-like appearance of the fly and add to its effectiveness as a lure.

It is to be understood that various changes and modifications may be made in the details of construction and design of the above specifically described embodiment without departing from the spirit thereof and limited only by the scope of the following claims.

What is claimed is:

1. An artificial fish lure, comprising a fishhook having a shank portion with a barb at one end and an eye at the other end, hackles having their inner end portions lying against the said shank of the hook, a binding thread wound about the said shank and the inner end portions of said hackles to secure the latter to the shank, braided raffia having its inner end portion disposed beneath the winding of the thread and along the shank, said binding thread being wound back upon itself over the inner end portion of the braid to secure the same to said shank, the free end portion of said braided raffia being wound about the shank and over the winding of the binding thread and having several reduced turns about the shank near the hook eye, said binding thread being wrapped several turns tightly about the reduced turns of the braided raffia to provide a tapering shoulder, the outer end portions of the hackles being bent back over the tapering shoulder to flare the hackles backwardly about the body of the lure, and an outer binding thread wound over the bent portion of the hackles to hold the same in position on the tapering shoulder and simulating an insect head.

2. An artificial fish lure comprising a fishhook having a shank portion with a barb at one end, hackles having their inner end portions lying against the shank of said hook, a binding thread wound about said shank and said inner end portions of said hackles, a braid having its inner end portion secured to the shank by said binding thread and being wound about the binding thread and said shank, the free end portion of said braid having several reduced turns about the shank near the end remote from the barb, said binding thread being wrapped several turns tightly about the reduced turns of the braid to provide a tapering shoulder, the outer end portions of the hackles being bent back over the tapering shoulder to flare the hackles backwardly about the body of the lure, and an outer binding wound over the bent portion of the hackles to hold the same in position on the tapering shoulder.

3. An artificial fish lure comprising a fish-hook having a shank with a barb at one end, hackles having their inner end portions lying against the shank, means for binding such inner end portions of the hackles to the shank, a braid having its inner end portion secured to the shank and wound about such shank over the inner ends of the hackles and over the winding of the binding means whereby to build up the body of the lure, a number of binding convolutions wound tightly about the windings of said braid at the end of the braid remote from the barb whereby to produce a tapering shoulder, the outer end portions of the hackles being bent back over such tapering shoulder and being directed by such tapering shoulder into a flaring condition extending about the body of the lure, and binding means for holding the bent portion of the hackles against said tapering shoulder.

4. An artificial fish lure comprising a fishhook having a shank with a barb at one end, hackles having their inner end portions disposed along said shank, means for binding such inner end portions of the hackles to the shank, a lure body built up upon such inner end portions of the hackles and about the shank, said lure body having a tapering shoulder at the end thereof remote from said barb, the outer end portions of the hackles being bent back over the tapering shoulder and against said tapering shoulder whereby such outer ends of the hackles assume a flaring position from the shoulder backwardly and outwardly toward the barbed end, said hackles extending about the body of the lure and simulating the body and wings of an insect, and binding means about the bent portions of the hackles outwardly of said tapering shoulder for holding the outer end portions of the hackles in position against said shoulder, said last mentioned binding means simulating the head of an insect.

LEROY W. STRONG.